United States Patent
Thomas et al.

[11] Patent Number: 5,960,694
[45] Date of Patent: Oct. 5, 1999

[54] HYDROSTATIC POWER STEERING SYSTEM HAVING REDUCED WHEEL SLIP

[75] Inventors: David W. Thomas, Plymouth; David E. Ewel, Eden Prairie; Timothy A. Hjelsand, Waconia; Jerry F. Carlin, Mound, all of Minn.; Russell P. Schuchmann, Milwaukee, Wis.

[73] Assignee: Eaton Corporation, Cleveland, Ohio

[21] Appl. No.: 09/028,218

[22] Filed: Feb. 23, 1998

[51] Int. Cl.⁶ .............................. F15B 9/03; F16D 31/02
[52] U.S. Cl. .................. 91/363 R; 91/375 R; 60/384; 180/412; 180/415; 180/422
[58] Field of Search ................... 91/361, 363 R, 91/375 R; 180/412, 414, 415, 422; 60/384

[56] References Cited

U.S. PATENT DOCUMENTS

| | | | |
|---|---|---|---|
| 3,801,239 | 4/1974 | Larson | 418/61 B |
| 4,703,819 | 11/1987 | Hosotani | 180/132 |
| 4,792,008 | 12/1988 | Hosotani | 180/142 |
| 5,020,618 | 6/1991 | Nagao | 180/132 |
| 5,136,844 | 8/1992 | Stephenson et al. | 60/384 |
| 5,289,892 | 3/1994 | Notsu | 60/384 |
| 5,303,636 | 4/1994 | Stephenson et al. | 91/361 |

*Primary Examiner*—Hoang Nguyen
*Attorney, Agent, or Firm*—L. J. Kasper

[57] ABSTRACT

A hydrostatic power steering system comprising a fluid motor (19) which receives pressurized fluid from a controller (17) in response to the rotation of a vehicle steering wheel (W). As the motor (19) or the steered wheels reach the stops, control logic (31) receives signals (37,77) representing steered wheel and steering wheel position, respectively, and generates appropriate command signals (33,27) to a pressure reducing/relieving valve (15) and to a proportional electromagnetic valve (23), respectively, closing the valve (15) somewhat, and opening the valve (23). A pressure differential is built between an additional fluid path (21) and the high pressure conduit (15c) between the controller (17) and the fluid motor (19). Pressure is communicated through the valve (23) into the conduit (51c), and back into the fluid meter (43) of the controller, preventing any further rotation thereof in response to an attempt to turn the steering wheel, thus eliminating travel limit slip.

4 Claims, 2 Drawing Sheets

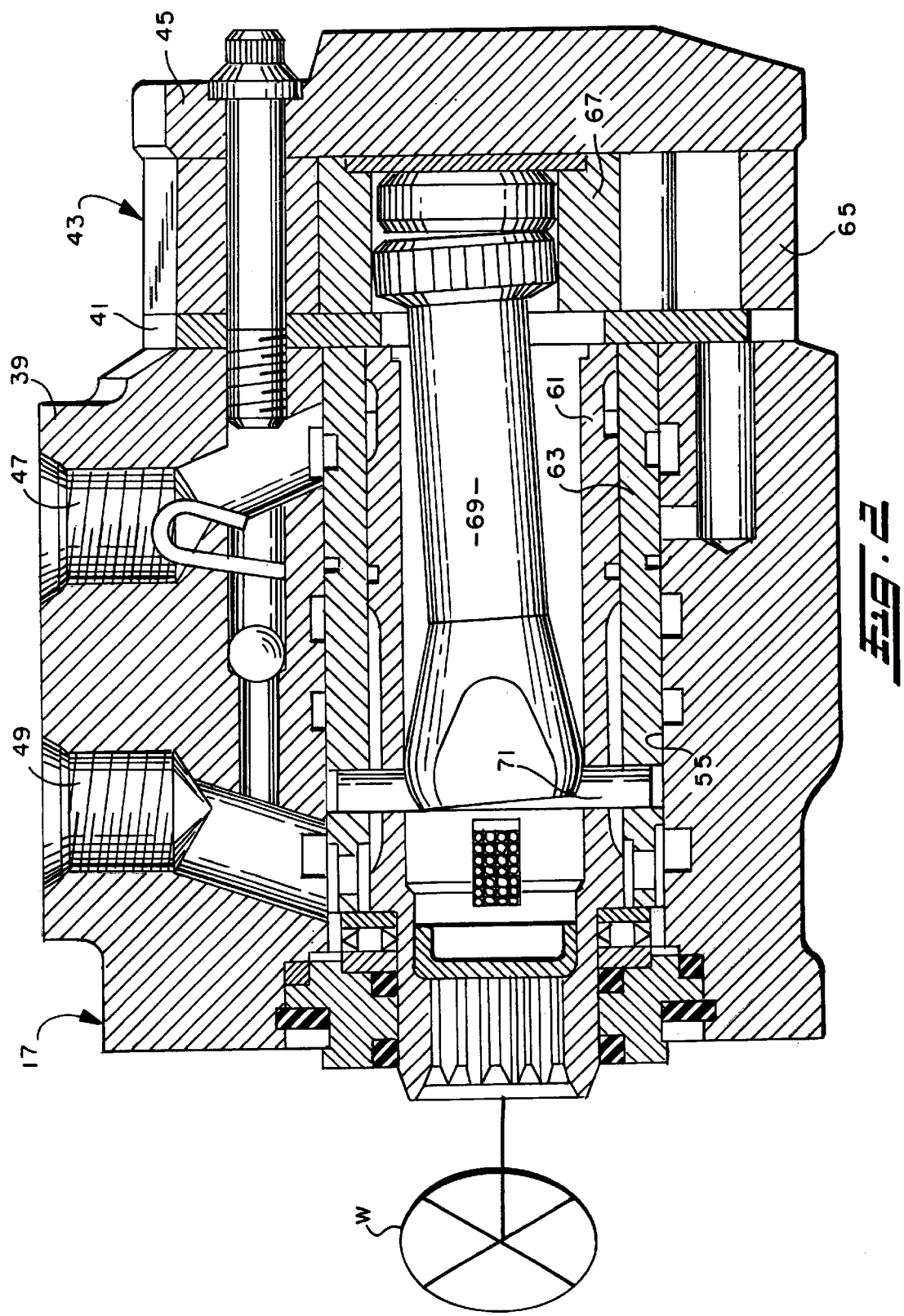

HYDROSTATIC POWER STEERING SYSTEM HAVING REDUCED WHEEL SLIP

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to hydrostatic power steering systems of the type used to control the flow of fluid from a source of pressurized fluid to a vehicle steering device, such as a cylinder or rotary motor.

A typical hydrostatic power steering system includes a fluid controller of the type having a housing, which defines various fluid ports, and further includes a fluid meter and valving, operable in response to an input, such as the rotation of the vehicle steering wheel. The typical fluid controller also includes an arrangement for imparting follow-up movement to the valving in response to the flow of fluid through the controller valving and the fluid meter to the steering device. The flow of fluid through the controller valving is proportional to the rate at which the steering wheel is rotated.

Steering systems and fluid controllers of the type to which the present invention relates are illustrated and described further in U.S. Pat. No. 3,801,239, assigned to the assignee of the present invention and incorporated herein by reference. The fluid controller of the cited patent was developed in response to a problem which has been referred to as "travel limit slip". When the steering cylinder attached to the vehicle steered wheels reaches the end of its stroke, or hits a mechanical stop, the steered wheels have reached the end of their travel. However, because of leakage out of the fluid meter and valving of the controller, continued application of turning force to the steering wheel by the vehicle operator will result in the steering wheel continuing to turn, although typically at a slower rate. The rate of steering wheel rotation in this condition (against the "stops") is known as the "travel limit slip rate" (TLSR) and is measured in revolutions per minute of the steering wheel.

Those skilled in the art will understand that the above explanation also applies to power steering systems in which the fluid pressure operated device is not a linear steering cylinder, but instead, is a rotary fluid motor, and the invention will be described in connection therewith.

An attempt to overcome the travel limit slip problem, or at least reduce the TLSR, was illustrated and described in U.S. Pat. No. 5,136,844, also assigned to the assignee of the present invention and incorporated herein by reference. The fluid controller of the cited patent is of the type referred to as having a "plugged star", i.e., the gerotor (meter) star receives within a counterbore at its rearward face a plug member. Fluid pressure is communicated to the region adjacent the plug, whenever the controller valving approaches its maximum displacement position, thus biasing the opposite end of the gerotor star into frictional engagement with an adjacent housing surface. Although the fluid controller illustrated and described in U.S. Pat. No. 5,136,844 has been generally successful in reducing the TLSR, the invention of the cited patent does involve a substantial redesign of the fluid controller. For example, the valving must be modified, and additional fluid passages provided in both the housing and the endcap.

Certain hydrostatic power steering systems now available are of the type referred to as "knob control" systems, in which there is typically a steered wheel position sensor, and a steering wheel position sensor. Also, such systems generally include valving to port fluid to or from either the high pressure or low pressure side of the system, as a way of compensating for leakage, etc. As a result, the steered wheels are kept proportionately aligned with (in "registry" with) the "knob" on the steering wheel, as is generally considered desirable by vehicle operators, thus the term "knob control".

On a knob control steering system, the valving which ports fluid typically comprises a pair of electrically controlled auxiliary valves, with the electrical control signal to the valves being in response to the generation of an error signal, wherein the error signal is calculated to reflect any deviation of the steered wheels from that commanded by the position of the steering wheel.

BRIEF SUMMARY OF THE INVENTION

Accordingly, it is an object of the present invention to provide an improved hydrostatic power steering system which can substantially eliminate travel limit slip.

It is a more specific object of the present invention to provide an improved steering system which can actively oppose any effort by the vehicle operator to steer "past the stops".

It is another, more specific object of the present invention to provide an improved steering system of the knob control type which can substantially eliminate travel limit slip, using primarily the sensors, valves, and controls which are already part of the steering system.

The above and other objects of the invention are accomplished by the provision of an improved hydrostatic power steering system comprising a source of pressurized fluid, a fluid pressure actuated device including means operable to indicate steered wheel position, a fluid controller operated by means of a steering input device, and being in fluid communication with the source of pressurized fluid by means of a fluid supply passage, and with the fluid pressure actuated device by means of a high-pressure path and a low pressure path. The fluid controller includes means operable to indicate steering device position, and control logic is operable to compare the steered wheel position and the steering device position and generate an error signal representative of the difference therebetween.

The improved steering system is characterized by the source of pressurized fluid including means operable to generate an additional path of pressurized fluid, at a pressure somewhat greater than the fluid pressure in the high pressure path. A valve means is in fluid communication between the additional path of pressurized fluid and the high pressure path, and operable between a first position blocking fluid communication and a second position permitting fluid communication. The control logic includes means operable to determine when the steered wheel position approaches a predetermined position, and when the error signal approaches zero, and to generate a command signal to the valve means to move the valve means toward the second position. In the second position, the additional path of pressurized fluid is in communication with the high pressure path, substantially preventing further movement of the steering input device, and maintaining the error signal at approximately zero.

BRIEF DESCRIPTION OF THE DRAWINGS

FIG. 2 is an axial cross-section of a fluid controller of the type with which the present invention may be utilized.

DETAILED DESCRIPTION OF THE PREFERRED EMBODIMENT

Figure 1:
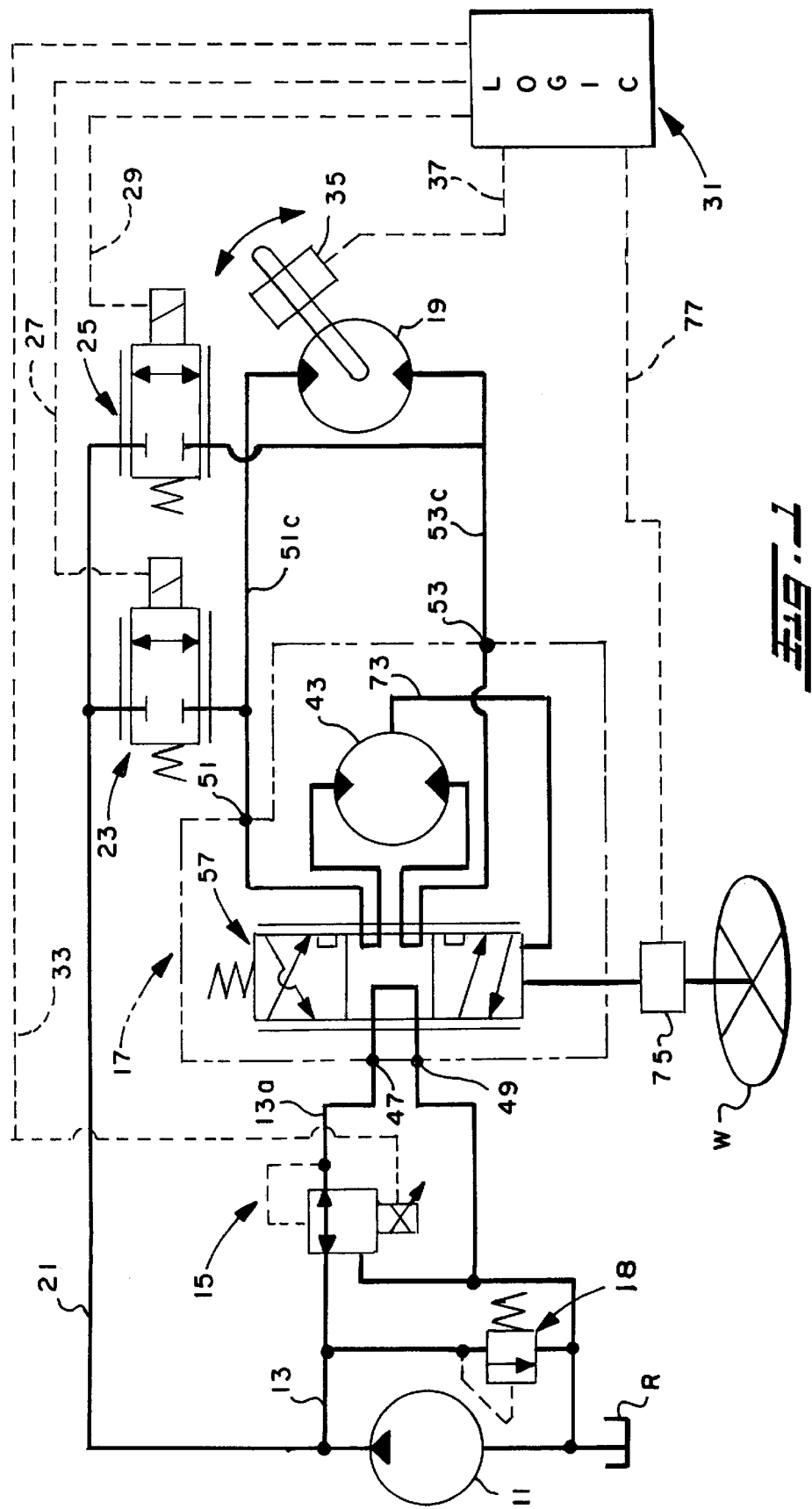
FIG. 1 is a hydraulic schematic of a hydrostatic power steering system made in accordance with the present invention.

Referring now to the drawings, which are not intended to limit the invention, FIG. 1 is a schematic of a hydrostatic power steering system made in accordance with the present invention. The system includes a fluid pump 11 which has its inlet connected to a system reservoir R. The outlet of the pump 11 is communicated by means of a conduit 13 through a pressure reducing/relieving valve 15, then through a conduit 13a to a fluid controller, generally designated 17. In parallel with the pump 11 is a conventional pressure relief valve 18, as is common in such steering systems.

As may be seen in more detail in FIG. 2, the fluid controller 17 is operated by a steering input device, such as a steering wheel W, to control the flow of fluid to a steering device, illustrated herein as a rotary fluid motor 19. It should be understood that the present invention is not limited to any particular type of steering input device, or to any particular type of fluid pressure actuated steering (output) device. For example, the steering input device could comprise some sort of joystick arrangement.

In parallel with the conduit 13, and also connected to the output of the pump 11 is a conduit 21 which comprises an additional fluid path, and which is connected to a pair of proportional electromagnetic valves 23 and 25. As shown in FIG. 1, the valves 23 and 25 are of the normally-closed type, blocking flow therethrough in the absence of an appropriate electrical input command signal. The valves 23 and 25 receive their input command signals by means of electrical leads 27 and 29, respectively, the reference numerals "27" and "29" also being used hereinafter to refer to the command signals themselves. Although the valves 23 and 25 are shown schematically as being disposed separate from the controller 17, the valves 23 and 25 would typically be included in a port-block valve assembly, bolted to the housing of the controller 17 in a well known manner.

The command signals 27 and 29 are generated by control logic, generally designated 31. The control logic 31 also generates an appropriate command signal to operate the pressure reducing/relieving valve 15, and transmits it over an electrical lead 33, the reference numeral "33" also being used hereinafter to designate the command signal itself.

The output position of the rotary fluid motor 19 is sensed by some suitable means, illustrated schematically herein as a position sensor 35, and a signal representative of the output position of the motor 19 is transmitted over an electrical lead 37 to the control logic 31, the reference numeral "37" also being used hereinafter in reference to both the signal transmitted by the position sensor 35, as well as the "steered wheel position", a term well known to those skilled in the art.

Referring now to FIG. 2, in conjunction with FIG. 1, the fluid controller 17 will be described only briefly in view of the above-incorporated patents. The controller 17 comprises several sections, including a valve housing 39, a port plate 41, a section comprising a fluid meter 43 (see also FIG. 1), and an end cap 45. The housing 39 defines an inlet port 47, a return port 49, and a pair of control (actuator) ports 51 and 53 (which are shown only schematically, and only in FIG. 1). The control port 51 is connected to the fluid motor 19 by means of a conduit 51c, while the control port 53 is connected to the fluid motor 19 by means of a conduit 53c, it being understood that either conduit 51c or 53c may be "high" pressure, depending upon whether a left or right turn is being made. Those skilled in the art will understand that, because the controller 17 is really a fluid metering device, the difference in pressure between the conduits 51c and 53c may be fairly small, and terms such as "high" and "low" are used more to indicate direction of flow, to and from the fluid motor 19, respectively.

The valve housing 39 defines a cylindrical valve bore 55, and disposed therein is the controller valving, generally designated 57 (see FIG. 1). As is well known to those skilled in the art, the controller valving 57 typically includes a primary, rotatable valve member (spool) 61, and a cooperating, relatively rotatable follow-up valve member (sleeve) 63. The spool valve 61 is directly, and mechanically connected to the vehicle steering wheel W, as is well known. However, the present invention is not limited to any particular design of fluid controller, valving, etc., except as is specifically set forth in the appended claims.

The fluid meter 43 may be of any suitable construction, but in the subject embodiment, comprises a gerotor gear set including an internally toothed stator or ring 65, and an externally toothed rotor or star 67. As is well known to those skilled in the art, the functions of the fluid meter 43 are to "meter" or measure the flow of fluid through the meter 47, and then to provide a follow-up movement to the controller valving 57, with the amount of follow-up movement being proportional to the flow of fluid through the fluid meter 43. Specifically, the follow-up movement is transmitted to the sleeve valve 63 by means of a main drive shaft 69 and a drive pin 71.

Referring again primarily to FIG. 1, there is illustrated schematically a mechanical feedback 73 which comprises the drive shaft 69 and the drive pin 71 of FIG. 2. The system includes a device, shown schematically as a position sensor 75 mounted on, or in association with, the steering column, to generate a signal representative of the position, rotationally, of the steering wheel W. The steering wheel position signal is transmitted by an electrical lead 77 to the control logic 31, the reference numeral "77" hereinafter also referring to the position signal itself.

During normal vehicle operation, the signals 37 and 77 which are sent to the logic 31 indicate that the rotary fluid motor 19 is not operating near the stops. As a result, an appropriate control signal 33 is sent to the pressure reducing/relieving valve 15, such that it is in its normally wide open condition, and the fluid pressure communicated to the inlet port 47 is substantially the same as that in the conduit 21. At the same time, appropriate control signals 27 and 29 (which may be no signal) are transmitted to the electromagnetic valves 23 and 25, respectively, such that the valves 23 and 25 remain in the closed positions shown in FIG. 1. In the operating condition just described, normal vehicle steering occurs, in the same general manner as that which occurs with a typical prior art hydrostatic power steering system.

During normal steering operation as described above, the steering wheel position signal 77 may be viewed as the input to the logic, whereas the steered wheel position signal 37 may be viewed as the signal which the logic controls. However, such is no longer the case as the steered wheels approach the stops (also referred to hereinafter as a "predetermined position"), as will now be described, wherein the signal 37 effectively becomes the input to the logic 31, and the signal 77 effectively becomes the signal which is controlled by the logic. In either case, one function of the logic 31 is to compare the steered wheel position 37 to the steering wheel position 77, and generate an "error" signal representing the difference therebetween, in a manner generally well known in the controls art. In regard to the term "error signal", it will be understood that to some extent the existence of an error signal is only theoretical, as it is the purpose of the control logic continually to "zero out" the error signal, i.e., eliminate any difference between the actual and commanded steered wheel positions.

Referring still to FIG. 1, as the steered wheels approach the stops, the signal 37 changes to reflect this fact, until the steered wheels (or the fluid motor 19) eventually reach a mechanical stop, so that neither the steered wheels nor the motor can turn any further. When the signal 37 indicates "a steering-against-the-stops" condition, the logic 31 modifies the signal 33, to begin to close the pressure reducing/relieving valve 15 somewhat, thus building a pressure differential across the valve 15. The result will be a higher pressure in the conduit 21 than in the conduit 13a leading to the inlet port 47 of the controller 17. References hereinafter and in the appended claims to the "additional fluid path" 21 generating a pressure greater than that in the high pressure path (51c or 53c) will be understood to mean and include any sort of valve means or other pressure reducing/relieving means which is capable of causing the pressure in the conduit 21 to be higher than that in the conduit 13a, or conversely, which is capable of causing the pressure in the conduit 13a to be less than that in the conduit 21. At the same time, the logic 31 also changes the signal 27 being transmitted to the electromagnetic valve 23, assuming that the control port 51 is connected to the inlet of the fluid motor 19. In this assumed scenario, the signal 29 remains as it was during normal steering, and the valve 25 remains closed.

When the valve 23 opens, the relatively higher pressure in the conduit 21 is communicated to the high pressure conduit 51c, but because the fluid motor 19 is already stopped, the higher pressure can't turn (displace) the motor 19 any further, and the position of the steered wheels remains unchanged. However, the relatively higher pressure in the conduit 51c (i.e., relatively "higher" compared to that at the inlet port 47) has the effect of preventing the meter 43 from turning further, in the same direction, because of the presence of a pressure differential acting on the fluid meter 43, with the relatively higher pressure being on the "output" side of the meter. Thus, travel limit slip of the steering wheel W is prevented.

An additional function accomplished by the present invention is that the pressurized fluid communicated through the valve 23 into the conduit 51c effectively "saturates" the leakage in the system, i.e., the incoming pressurized fluid is at least sufficient to compensate for any leakage, without there being undesirable movement of the steering wheel W, as a result of such leakage.

Those skilled in the art will understand that the particular pressure differential needed, and therefore the selection of the pressure reducing/relieving valve 15, is a function of factors such as the size of the fluid meter 19. In other words, the object of the invention is to apply a sufficient reverse torque on the fluid meter, whenever the stops are reached, to prevent any further rotation of the steering input device.

However, in accordance with another aspect of the invention, it is not satisfactory merely to apply a reverse pressure differential across the fluid meter, because it is not desired to actually drive the meter and the steering wheel in the reverse direction., i.e., opposite to the direction which was selected by the vehicle operator as he steered into the stops. Instead, what is desired is now to control the pressure differential between the conduit 21 and the inlet port 47 so that, as long as the steered wheels are against the stops, the steering wheel W will remain substantially stationary, even in response to variations in torque applied by the operator to the steering wheel.

Thus, any attempt by the vehicle operator to turn the steering wheel further will be sensed by a change in the signal 77, causing the pressure reducing/relieving valve 15 to close further, thereby increasing the pressure differential across the fluid meter 43. In other words, for any given steering input which the vehicle operator attempts to apply to the steering wheel W, the system generates an appropriate reverse torque on the fluid meter 43, such that the end result is always substantially zero actual movement of the steering wheel W.

If the vehicle operator begins to rotate the steering wheel W in the opposite direction, to move the fluid motor 19 away from the stops, the signal 33 will be modified accordingly by the logic 31, and the pressure reducing/relieving valve 15 will begin to open proportionately. As this occurs, the pressure differential between the conduit 21 and the inlet port 47 will be reduced, and the system will resume its normal function of maintaining correspondence or registry of the position of the steered wheels relative to the position of the steering wheel.

In the above-described scenario, rotation of the steering wheel W in one direction was assumed, such that the control port 51 was the output of the controller 17. If the steering wheel W is rotated in the opposite direction, to turn the vehicle in the opposite direction, the control port 53 is the output of the controller. In that case, when steering into the stop in the opposite direction, the logic 31 will generate a signal 27 which leaves the valve 23 closed, but will generate an appropriate signal 29 to open the valve 25. The signal 33 transmitted to the valve 15 may be the same, and the valve 15 will operate the same as in the other turn direction, but now with the valve 25 open, the higher pressure in the conduit 21 is communicated to the conduit 53c, which prevents further turning of the fluid meter, in the same manner as described previously.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A hydrostatic power steering system comprising a source of pressurized fluid, a fluid pressure actuated device including means operable to indicate steered wheel position, a fluid controller operated by means of a steering input device, and being in fluid communication with said source of pressurized fluid, by means of a fluid supply passage and with said fluid pressure actuated device by means of a high pressure path and a low pressure path; said fluid controller including means operable to indicate steering device position, control logic operable to compare said steered wheel position and said steering device position and to generate an error signal representative of the difference therebetween; characterized by:

(a) said source of pressurized fluid including means operable to generate an additional path of pressurized fluid, at a pressure somewhat greater than the fluid pressure in said high pressure path;

(b) valve means in fluid communication between said additional path of pressurized fluid and said high pressure path, and operable between a first position blocking fluid communication and a second position permitting fluid communication; and (c) said control logic including means operable to determine when said steered wheel position approaches a predetermined position, and when said error signal approaches zero, and to generate a command signal to said valve means to move said valve means toward said second position, whereby said additional path of pressurized fluid is in communication with said high pressure path, substantially preventing further movement of said steering input device, and maintaining said error signal at approximately zero.

2. A hydrostatic power steering system as claimed in claim 1, characterized by said fluid controller being of the type including steering valve means operable in response to movement of said steering input device, and a fluid meter operable to impart follow-up movement to said steering valve means proportional to the volume of fluid flow through said fluid meter.

3. A hydrostatic power steering system as claimed in claim 1, characterized by said means operable to generate said additional path of pressurized fluid comprises a pressure reducing/relieving valve having its inlet in fluid communication with said valve means and its outlet in fluid communication with an inlet port of said fluid controller, and being operable to reduce/relieve the pressure in said high pressure path in response to variations in said command signal.

4. A hydrostatic power steering system as claimed in claim 3, characterized by said pressure reducing/relieving valve having a normally open position and a pressure reducing position, and being operable, in response to receiving said command signal, to move toward said pressure reducing position.

* * * * *